(12) United States Patent
Drake

(10) Patent No.: US 11,874,240 B2
(45) Date of Patent: Jan. 16, 2024

(54) SYSTEMS AND METHODS FOR INTERPRETING HIGH ENERGY INTERACTIONS

(71) Applicant: DECISION TREE, LLC, Greeley, CO (US)

(72) Inventor: Brandon Lee Goodchild Drake, Greeley, CO (US)

(73) Assignees: Decision Tree, LLC, Greeley, CO (US); Veracio Ltd., Salt Lake City, UT (US)

( * ) Notice: Subject to any disclaimer, the term of this patent is extended or adjusted under 35 U.S.C. 154(b) by 397 days.

(21) Appl. No.: 17/282,206

(22) PCT Filed: Oct. 4, 2019

(86) PCT No.: PCT/US2019/054741
§ 371 (c)(1),
(2) Date: Apr. 1, 2021

(87) PCT Pub. No.: WO2020/072930
PCT Pub. Date: Apr. 9, 2020

(65) Prior Publication Data
US 2021/0341400 A1 Nov. 4, 2021

Related U.S. Application Data

(60) Provisional application No. 62/741,231, filed on Oct. 4, 2018.

(51) Int. Cl.
*G01N 23/223* (2006.01)
*G06N 20/00* (2019.01)
(Continued)

(52) U.S. Cl.
CPC ....... *G01N 23/223* (2013.01); *G01N 23/2076* (2013.01); *G06F 18/214* (2023.01); *G06F 18/24* (2023.01); *G06N 20/00* (2019.01)

(58) Field of Classification Search
None
See application file for complete search history.

(56) References Cited

U.S. PATENT DOCUMENTS

| 5,379,764 A | 1/1995 | Barnes et al. |
| 2004/0012789 A1 | 1/2004 | Guthermann |

(Continued)

OTHER PUBLICATIONS

Subias et al. "Discriminating qualitative model generation from classified data." in: 20th International Workshop on Qualitative Reasoning (QR-06). Jul. 2006 (Jul. 2006) Retrieved on Nov. 26, 2019 (Nov. 26, 2019) from <https://www.researchgate.net/profile/Louise_Trave-Massuyes/publication/228346854_Discriminating_qualitative_model_generation_from_classified_data/links/55b11a0808aed621ddfd3a9c/ Discriminating-qualitative-model-generation-from-classified-data.pdf>.

(Continued)

*Primary Examiner* — Hoon K Song
(74) *Attorney, Agent, or Firm* — Ballard Spahr LLP

(57) ABSTRACT

Systems and methods for interpreting high-energy interactions on a sample are described in this application. In particular, this application describes an analysis method that comprises impinging radiation from a source on an analyte, detecting the energy interactions resulting from the impinging radiation using a radiation detector, adjusting the signal from the radiation detector using a machine learning module to emphasize specific parts of the detector signal, training the machine learning module in a supervised or unsupervised manner, producing quantitative and qualitative models using the machine leaning module, and then applying the machine learning module to additional energy interactions. The signal received by the detector can be preprocessed to emphasize specific parts of the detector signal, which is then mapped to a machine learning module for training in a supervised or unsupervised manner. The quantitative and (Continued)

qualitative models derived from this training can be applied to new detector inputs from the same or similar instruments. Other embodiments are described.

21 Claims, 8 Drawing Sheets

(51) Int. Cl.
  *G01N 23/207* (2018.01)
  *G06F 18/24* (2023.01)
  *G06F 18/214* (2023.01)

(56) References Cited

U.S. PATENT DOCUMENTS

| | | |
|---|---|---|
| 2008/0230702 A1 | 9/2008 | Rousso et al. |
| 2009/0121124 A1 | 5/2009 | Schneider |
| 2014/0297201 A1 | 10/2014 | Knorr et al. |
| 2017/0122889 A1 | 5/2017 | Weindorf et al. |
| 2018/0192977 A1* | 7/2018 | Jin .......................... A61B 6/482 |
| 2019/0017946 A1* | 1/2019 | Wack ................... G01N 23/201 |
| 2019/0302039 A1* | 10/2019 | Artemiev ............. G01N 23/201 |
| 2021/0285898 A1* | 9/2021 | Dikopoltsev .......... G01B 15/00 |

OTHER PUBLICATIONS

European Patent Office Search Report and Written Opinion for European Application No. EP19869475.

* cited by examiner

SYSTEMS AND METHODS FOR INTERPRETING HIGH ENERGY INTERACTIONS

CROSS-REFERENCE TO RELATED APPLICATION

This is a U.S. National Phase Application of International Application No. PCT/US2019/054741, filed Oct. 4, 2019, which claims priority of U.S. Provisional Application Ser. No. 62/741,231, filed on Oct. 4, 2018, the entire disclosure of which are hereby incorporated by reference.

FIELD

The present application generally relates to systems and methods for interpreting high-energy interactions on a sample. In particular, this application relates to the quantification and/or classification of the input from a detector as is produced from analytical instrumentation, in particular the generation of quantification and/or classification models generated via machine learning techniques.

BACKGROUND

The miniaturization of analytical instrumentation has enabled non-destructive analysis of objects, often by way of using portable systems. This shift contrasts with the past use of this type of equipment in which analytes were destroyed during the analysis process, in some instances by being prepared into matrices such as solutions and fused glass beads. Destructive sample preparation enabled quantification based on models which used the intensities of diagnostic fluorescent peaks, reflectively scattered angles, or emitted radiation following ionization. These signals are defined and interpreted via empirical calibration or estimation through physical and geometric parameters. This approach has largely been adopted for non- or minimally-destructive analyzers, though this type of analysis is greatly complicated by sample heterogeneity, chemical transformation, and uneven surfaces. Performance of non-destructive analyzers is thus generally inferior relative to their destructive counterparts.

These analytical instruments typically have the following three components: a high energy light or particle source, a geometric relationship with an analyte, and a detector capable of measuring the light or particle's interaction with the analyte. These detectors function differently and have different requirements, though each is capable of producing a spectrum with an energy/wavelength/geometry/degrees and response. These detector inputs are by necessity acquired via different instruments, components, or geometries.

SUMMARY

This application generally describes systems and methods for interpreting high-energy interactions on a sample. In particular, this application describes an analysis method that comprises impinging radiation from a source on an analyte, detecting the energy interactions resulting from the impinging radiation using a radiation detector, adjusting the signal from the radiation detector using a machine learning module to emphasize specific parts of the detector signal, training the machine learning module in a supervised or unsupervised manner, producing quantitative and qualitative models using the machine leaning module, and then applying the machine learning module to additional energy interactions. The signal received by the detector can be preprocessed to emphasize specific parts of the detector signal, which is then mapped to a machine learning module for training in a supervised or unsupervised manner. The quantitative and qualitative models derived from this training can be applied to new detector inputs from the same or similar instruments.

BRIEF DESCRIPTION OF THE DRAWINGS

The following description can be better understood in light of the Figures which show various embodiments and configurations of the systems and methods for interpreting high-energy interactions on a sample.

Figure 1A:
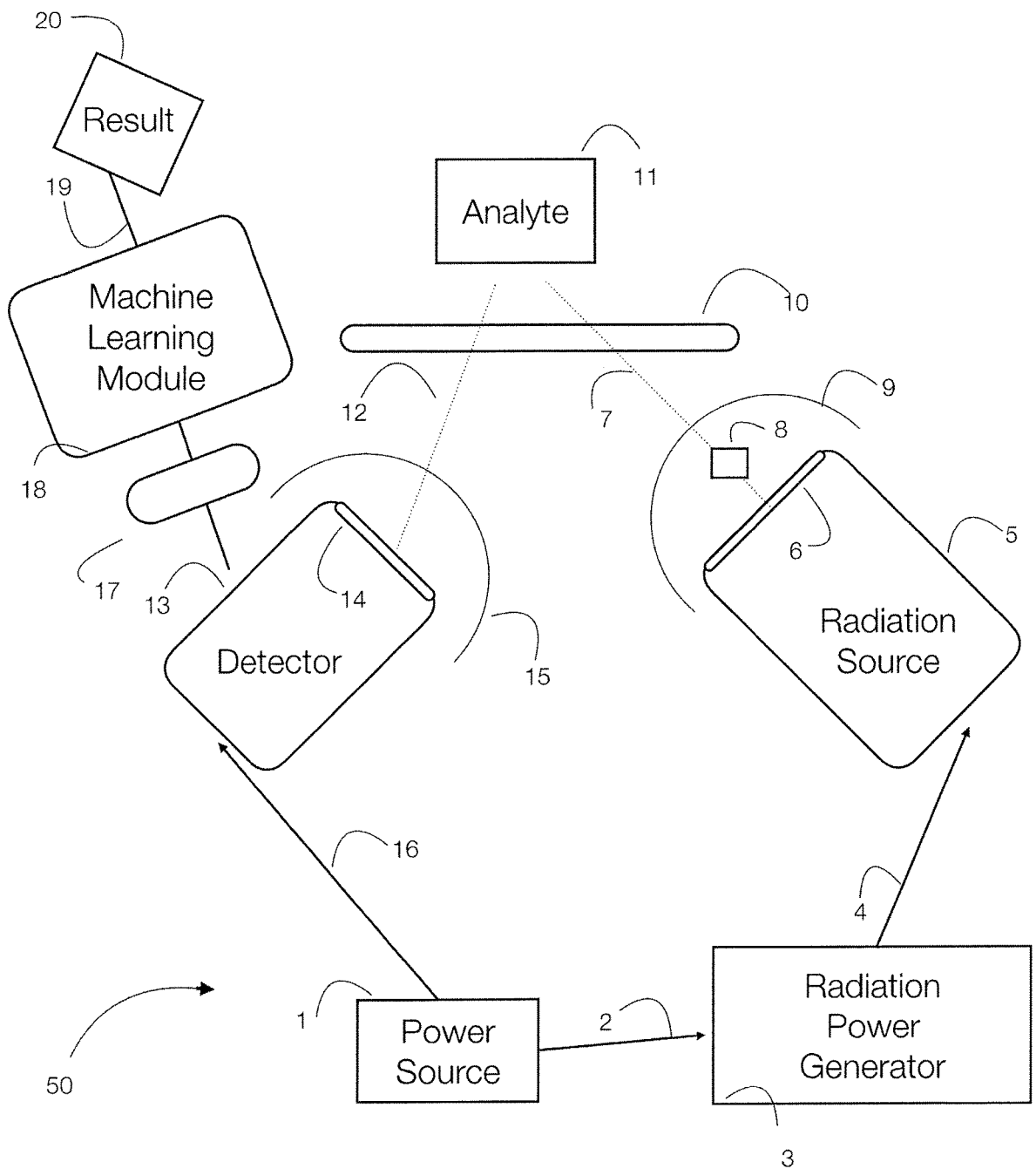
FIG. 1A shows a view of some embodiments of an XRF system containing a machine leaning module.

Together with the following description, the Figures demonstrate and explain the principles of the structures, methods, and principles described herein. In the drawings, the thickness and size of components may be exaggerated or otherwise modified for clarity. The same reference numerals in different drawings represent the same element, and thus their descriptions will not be repeated. Furthermore, well-known structures, materials, or operations are not shown or described in detail to avoid obscuring aspects of the described devices.

DETAILED DESCRIPTION

The following description supplies specific details in order to provide a thorough understanding. Nevertheless, the skilled artisan will understand that the described electronic devices can be implemented and used without employing these specific details. Indeed, the described systems and methods for using touchpads with multiple surfaces can be placed into practice by modifying the described systems and methods and can be used in conjunction with any other apparatus and techniques conventionally used in the industry. For example, while the description below focuses on x-ray fluorescence, they could be used with other devices and systems, including atomic emission spectroscopy. As well, while this description focuses on photon energy interactions, the systems and methods described herein could be used with electron or proton energy interactions.

In addition, as the terms on, disposed on, attached to, connected to, or coupled to, etc. are used herein, one object (e.g., a material, element, structure, member, etc.) can be on, disposed on, attached to, connected to, or coupled to another object—regardless of whether the one object is directly on, attached, connected, or coupled to the other object or whether there are one or more intervening objects between the one object and the other object. Also, directions (e.g., on top of, below, above, top, bottom, side, up, down, under, over, upper, lower, lateral, orbital, horizontal, etc.), if provided, are relative and provided solely by way of example and for ease of illustration and discussion and not by way of limitation. Where reference is made to a list of elements (e.g., elements a, b, c), such reference is intended to include any one of the listed elements by itself, any combination of less than all of the listed elements, and/or a combination of all of the listed elements. Furthermore, as used herein, the terms a, an, and one may each be interchangeable with the terms at least one and one or more.

In the systems and methods described herein, the radiation used can be any ionizing radiation that will create photon-electron interactions. In some embodiments, the radiation can be electromagnetic radiation, including radio waves, microwaves, infrared, ultraviolet, x-rays, and gamma rays. In other embodiments, the radiation can be particle radiation, such as alpha radiation, beta radiation, electrons, protons, and neutron radiation.

FIG. 1A illustrates some embodiments of the systems described herein. In these embodiments, the system 50 contains a power source 1 that is electrically connected via connection 2 to a radiation power generator 3, which in turn is electrically connected via connection 4 to a radiation source 5. The radiation source 5 in these embodiments includes a cathode (not shown) and an anode 6 that can vary in thickness due to manufacturing, erosion, or other processes. The radiation source 5 produces a radiation beam 7 that passes through a filter module 8 that may or may not influence the beam through filtration or change in diameter. In some configurations, the filter module 8 could include a collimator.

The radiation source 5 and filter/collimator module 8 can vary in the geometry 9 so that the radiation beam 7 has a desired intensity and impingement angle on the analyte 11. The radiation beam 7 emerging from the radiation source 5 can pass through a barrier 10 that may or may not attenuate or otherwise influence the beam 7. An analyte (or sample) 11 is irradiated by the radiation beam 7 and produces a post-analyte beam of radiation 12 from the consequences of ionization within it. This post-analyte beam 12 passes through a barrier 10 that may or may not attenuate or otherwise influence the post-analyte beam 12. The post-analyte beam 12 enters the radiation detector (or detector) 13 through a detector window 14 that may or may not attenuate it. The detector 13 can have variable geometry 15, which influences the angle and intensity of the incoming post-analyte beam 12. The detector 13 is powered by a power source 1 through an electrical connection 16. The power source 1 may or may not be shared with the radiation power generator 3 and/or radiation source 5. The detector 13 produces a signal 17 which is passed on to a machine learning module 18, which interprets the detector signal 17 and can send quantitative or qualitative results 20 via connection 19.

In some configurations, the radiation source 5 can contain any source that generates and emits X-rays, including a stationary anode X-ray source, a micro-focus x-ray source, a rotating anode x-ray source, and/or a fluoroscopic X-ray source. In other configurations, the radiation source 5 can emit particles such as electrons or protons. In these configurations, the detector 13 can contain any detector that detects X-rays, including a silicon-drift detector, silicon pin diode, silicon lithium detector, germanium detector, cadmium-telluride detector, monochromater, polychromater, photo-multiplier, charged-doubled device, image intensifier, a CMOS camera and/or a digital flat panel detector. In some configurations, the X-ray source and x-ray detector can be made modular so that different sizes and types of X-ray sources and x-ray detectors can be used in the x-ray device 100. In other configurations, the system can contain multiple x-ray sources and/or multiple x-ray detectors.

Figure 1B:
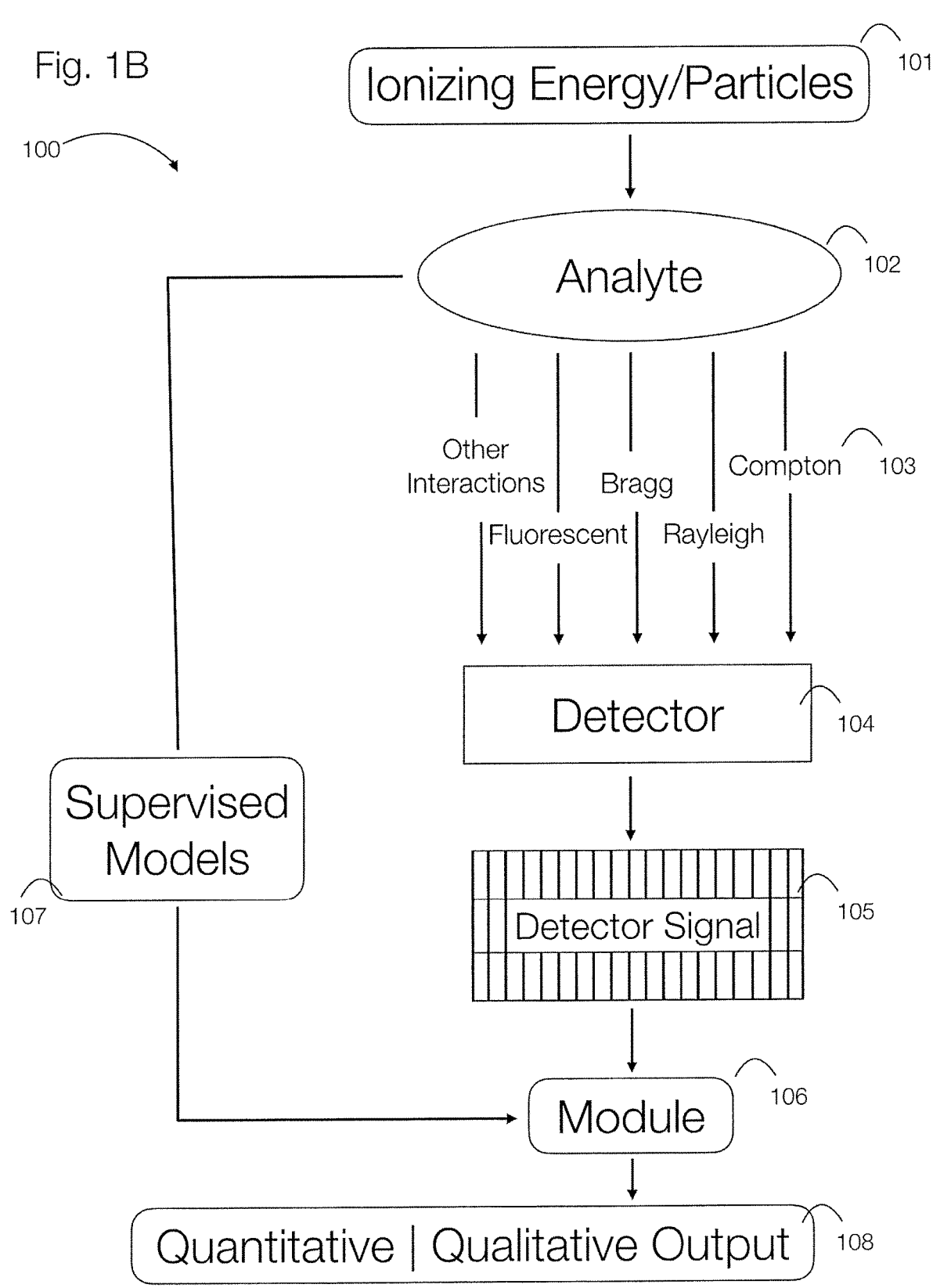
FIG. 1B shows a view of some embodiments of an XRF system containing a machine leaning modules.

Other embodiments of the systems described herein are shown in FIG. 1B. Similar to system 50, the system 100 contains an ionizing source 101 and a sample of a material being analyzed, or analyte 102. High-energy radiation or particle streams 101 (whether particles, photons, charged electrons, or protons) are emitted from a radiation source (not shown) and directed towards the analyte 102 so they impinge on the analyte 102. Examples of some radiation sources include an x-ray source and/or laser-induced ablation. Particular sources include an electron or proton generator. Examples of some radiation sources include an x-ray detector, spectrograph, and/or camera sensor. In some configurations, these systems can 100 be portable or even handheld. When the high energy radiation 101 impinges on the analyte 102, the material in the analyte emits a wide variety of energy signals 103 that can be detected by the detector 104. Examples of energy signals 103 can include fluorescence, coherent (Bragg) scattering, incoherent (Compton) scattering, elastic (Rayleigh) scattering, bremsstrahlung radiation, or other effects. The detector 104 in turn emits a detector signal 105 that can be output to the electronics (not shown) that includes a machine learning module 106. The machine learning module 106 could in some configurations use an algorithm with known values, referred to supervised models 107, informing how to interpret signals from the detector 104. In other configurations, the machine learning module 106 could interpret patterns in the data based on algorithms that do not use known values, referred to unsupervised models, to produce output 108. These known values can include the pre-existing energy peak for a specific material, its known quantitative value or qualitative property, its measurement on a similar instrument, and/or any other property derived through another method.

Yet other embodiments of the systems described herein as shown in FIG. 2B. In the systems 200 of FIG. 2B, a beam of ionized radiation 201 emitted from the material in a sample (not shown) enters a detector 202 through a window 203 that may or may not attenuate or otherwise affect the beam 201. This signal from the detector 203 enters the machine learning module 204 through an electrical connection 205. The machine learning module contains three stages: first a data preprocessing stage 206 wherein the data is normalized and/or adjusted in another way to highlight key features and reduce variance between different possible components or other variation within class. This preprocessed data is transported to a machine learning stage 207 where the data undergoes processing by a machine learning module trained on data collected under similar conditions. These data then proceed to a quality assurance and quality control stage 208 which addresses any potential errors, though related activities may or may not occur in the data preprocessing stage 206. These results are passed off to a result unit 209 which displays the results of the machine learning module 204. The machine learning module and the results unit 209 can be performed by separate processing units or a shared processing unit.

Figure 3:
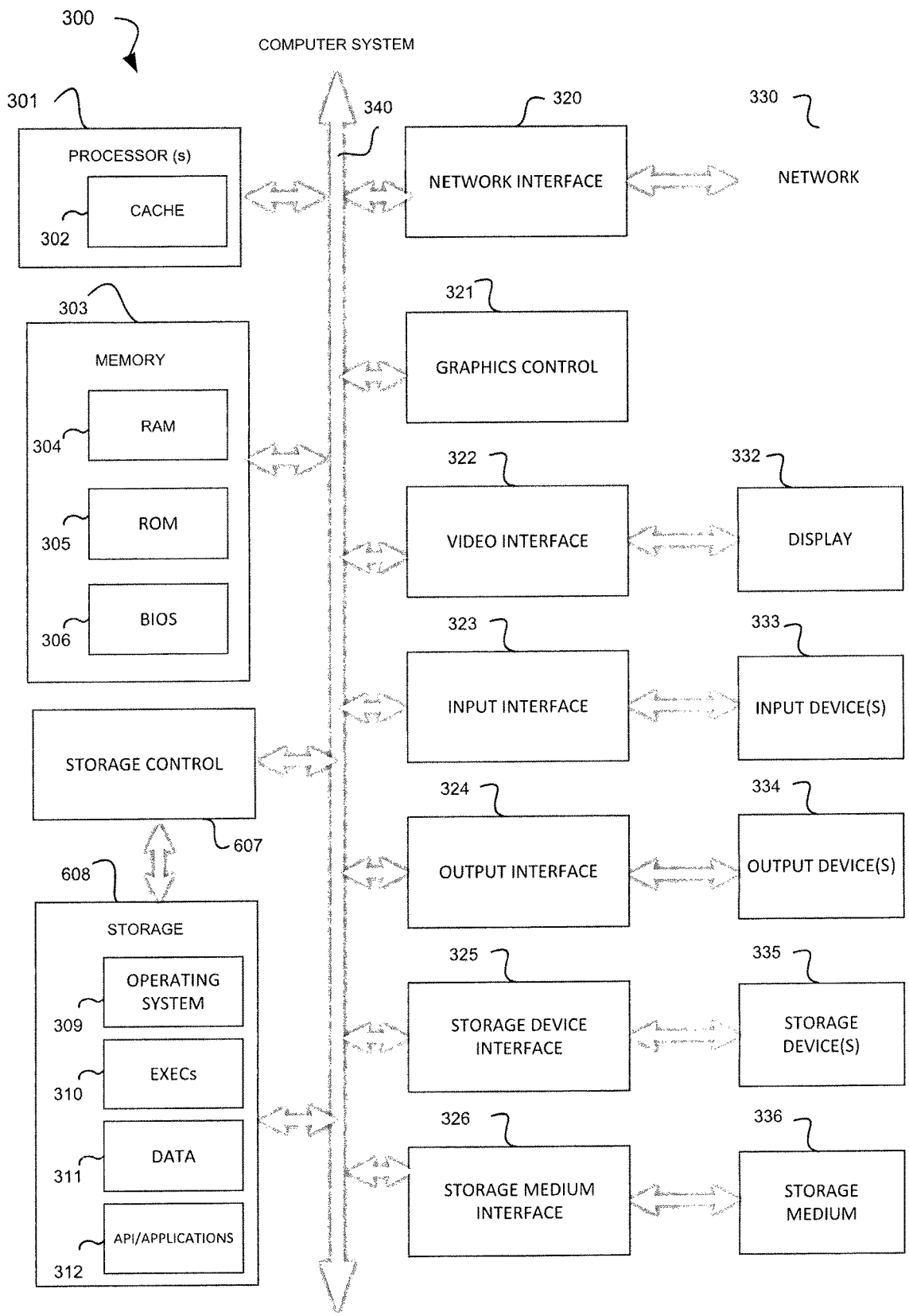
FIG. 3 shows a view of computer system that can be used with XRF systems.

The systems and methods described herein can be implemented in connection with any electronics, including the computer system illustrated in FIG. 3. Computer system 300 contains a set of non-transitory, processor executable instructions to perform or execute any of the methods described herein. The components in FIG. 3 are examples only and do not limit the use or functionality of any hardware, hardware combined with software, firmware, embedded logic component, or a combination of two or more such components. The computer system 300 can be implemented as a general purpose computer (e.g., a laptop computer), server, mobile device (e.g., tablet or smart phone) or an embedded logic device (e.g., an FPGA), to name just some non-limiting examples. As well, computer system 300 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Computer system 300 includes a processor 301 (or multiple processors) such as a central processing unit (CPU), graphical processing unit (GPU), application specific integrated circuit (ASIC), or a field programmable gate array (FPGA). The computer system 300 may also contain a memory component (or memory) 303 and a storage component (storage) 308 that communicate with each other and with other components via a bus 340. The bus 340 may also link one or more displays 332, one or more input devices 333 (e.g., a keypad, a keyboard, a mouse, a stylus, etc.), one or more output devices 334, one or more storage devices 335, and various non-transitory, tangible computer-readable storage media 336 with each other and with the processor 301, the memory 303, and the storage 308. All of these components can communicate directly or via one or more interfaces or adaptors to the bus 340. For example, the various non-transitory, tangible computer-readable storage media 336 can interface with the bus 340 via storage medium interface 326.

Processor(s) 301 optionally contains a cache memory unit 302 for temporary local storage of instructions or data. Processor(s) 301 can also execute computer-readable instructions stored on at least one non-transitory, tangible computer-readable storage medium. Computer system 300, as a result of the processor(s) 301, may also execute software embodied in one or more non-transitory, tangible computer-readable storage media, such as memory 303, storage 308, storage devices 335, storage medium 336 (i.e., read only memory or ROM), or the machine learning module 60. The non-transitory, tangible computer-readable storage media may store software that implements particular embodiments, and processor(s) 301 may execute the software.

Memory 303 may implement and/or execute the software from one or more other non-transitory, tangible computer-readable storage media (such as mass storage device(s) 335, 336) or from one or more other sources through any interface, such as network interface 320. The software may cause processor(s) 301 to carry the process(es) or step(s) of any process described herein. Executing such processes or steps may include defining data structures stored in memory 303 and modifying the data structures as directed by the software. In some embodiments, an FPGA can store instructions for carrying out the functionality while in other embodiments, firmware includes instructions for carrying out any functionality described herein.

The memory 303 may include various components (e.g., non-transitory, tangible computer-readable storage media) including random access memory component (e.g., RAM 304 whether static or dynamic RAM), a read-only component (e.g., ROM 305), and any combinations thereof. ROM 305 may communicate data and instructions unidirectionally to processor(s) 301, and RAM 304 may act to communicate data and instructions bidirectionally with processor(s) 301. ROM 305 and RAM 304 may include any suitable non-transitory, tangible computer-readable storage media. In some instances, ROM 305 and RAM 304 may include non-transitory, tangible computer-readable storage media for carrying out the methods described herein. A basic input/output system 306 (BIOS), including basic routines to transfer information between elements within computer system 300, may be stored in the memory 303.

Fixed storage 308 can be connected to processor(s) 301, optionally through storage control unit 307. Fixed storage 308 provides data storage capacity and may also include any suitable non-transitory, tangible computer-readable media described herein. Storage 308 may be used to store operating system 309, executable commands (EXEC) 310, data 311, API applications 312 (application programs), and the like. For example, multiple instances of the storage 308 could be used for storage by the machine learning module described herein. In some configurations, storage 308 can be a secondary storage medium (i.e., a hard disk) that is slower than primary storage (i.e., memory 303). Storage 308 can also include an optical disk drive, a solid-state memory device (e.g., flash-based systems), or a combination thereof. Information in storage 308 may also be incorporated as virtual memory in memory 303.

In some configurations, storage device(s) 335 may be removably interfaced with computer system 300 (e.g., via an external port connector (not shown)) via a storage device interface 325. Thus, storage device(s) 335 and an associated machine-readable medium may provide nonvolatile and/or volatile storage of machine-readable instructions, data structures, program modules, and/or other data for the computer system 300. For example, software may reside completely or partially within a machine-readable medium on storage device(s) 335. In another example, software may reside, completely or partially, within processor(s) 301.

Bus 340 connects a wide variety of subsystems and/or components in the computer system 300. Bus 340 may encompass one or more digital signal lines serving a common function. Bus 340 may also comprise any type of bus structures including a memory bus, a memory controller, a peripheral bus, a local bus, and any combinations thereof, using any of a variety of bus architectures. Such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and/or any combinations thereof.

Computer system 300 may also include an input device(s) 333. A user of computer system 300 may enter commands and/or other data into computer system 300 via input device(s) 333. Examples of an input device(s) 333 include an alpha-numeric input device (keyboard), a tracking device (mouse), a touchpad, touchscreen, a joystick, a gamepad, an audio input device (microphone), an optical scanner, a video or still image capture device (e.g., a camera), and any combinations thereof. Input device(s) 333 may interface with bus 340 via any number of input interfaces 323 including serial, parallel, game port, USB, FIREWIRE, or any combination thereof.

When computer system 300 is connected to a network 330, the computer system 300 may communicate with other electronic devices, such as mobile devices and enterprise systems, that are connected to network 330. Communications to and from computer system 300 may be sent through a network interface 320 which may receive incoming communications in the form of one or more packets (such as Internet Protocol (IP) packets) from network 330. Computer system 300 may then store the incoming communications in memory 303 for processing. Computer system 300 may also store outgoing communications in the form of one or more packets in memory 303 and communicate them to network 330 via network interface 320. Examples of the network interface 320 include a network interface card, a modem, and any combination thereof. Examples of a network 330 (or network segment 330) include a wide area network (WAN) (e.g., the Internet, an enterprise network), a local area network (LAN), a telephone network, virtual private network (VPN), a direct connection between two computing devices, and any combinations thereof. The network 330 may employ any wired and/or a wireless mode of communication.

Information and data can be displayed through a display (s) 332. Examples of a display 332 include a liquid crystal display (LCD), an organic liquid crystal display (OLED), a cathode ray tube (CRT), a plasma display, and any combinations thereof. The display 332 can interface to the processor(s) 301, memory 303, fixed storage 308, as well as other devices (i.e., input device(s) 333) via the bus 340. The display 332 can be linked to the bus 340 via a video interface 322, and transport of data between the display 332 and the bus 340 can be controlled via graphics controller 321. The results presented by the machine learning module 60 may also be displayed by the display 332.

The computer system 300 may include one or more other peripheral output devices 634 including an audio speaker, a printer, and any combinations thereof. Such peripheral output devices may be connected to the bus 340 via an output interface 324. Examples of an output interface 324 include a serial port, a parallel connection, a USB port, a FIREWIRE port, a THUNDERBOLT port, and any combinations thereof.

Computer system 300 may also provide functionality as a result of logic hardwired or otherwise embodied in a circuit, which may operate in place of or together with software to execute the process(es) or step(s) described herein. Software in the computer system 300 may encompass logic, and reference to logic may encompass software. As well, the non-transitory, tangible computer-readable medium may encompass a circuit (such as an IC) storing software for execution, a circuit embodying logic for execution, or both.

Within computer system 300, the same reference characters are used to refer to terminals, signal lines, wires, etc. and their corresponding signals. The terms signal and wire can represent one or more signals, e.g., the conveyance of a single bit through a single wire or the conveyance of multiple parallel bits through multiple parallel wires. And each wire or signal may represent unidirectional or bidirectional communication between two or more components connected by a signal or wire.

The various logical blocks, modules, and circuits described herein may be implemented or performed with a general purpose processor, a digital signal processor (DSP), ASIC, GPU, a FPGA or other programmable logic device, discrete gate or transistor logic, discrete hardware components, or any combination thereof designed to perform the functions described herein. A general purpose processor may be a microprocessor or may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other similar configuration.

Figure 4:
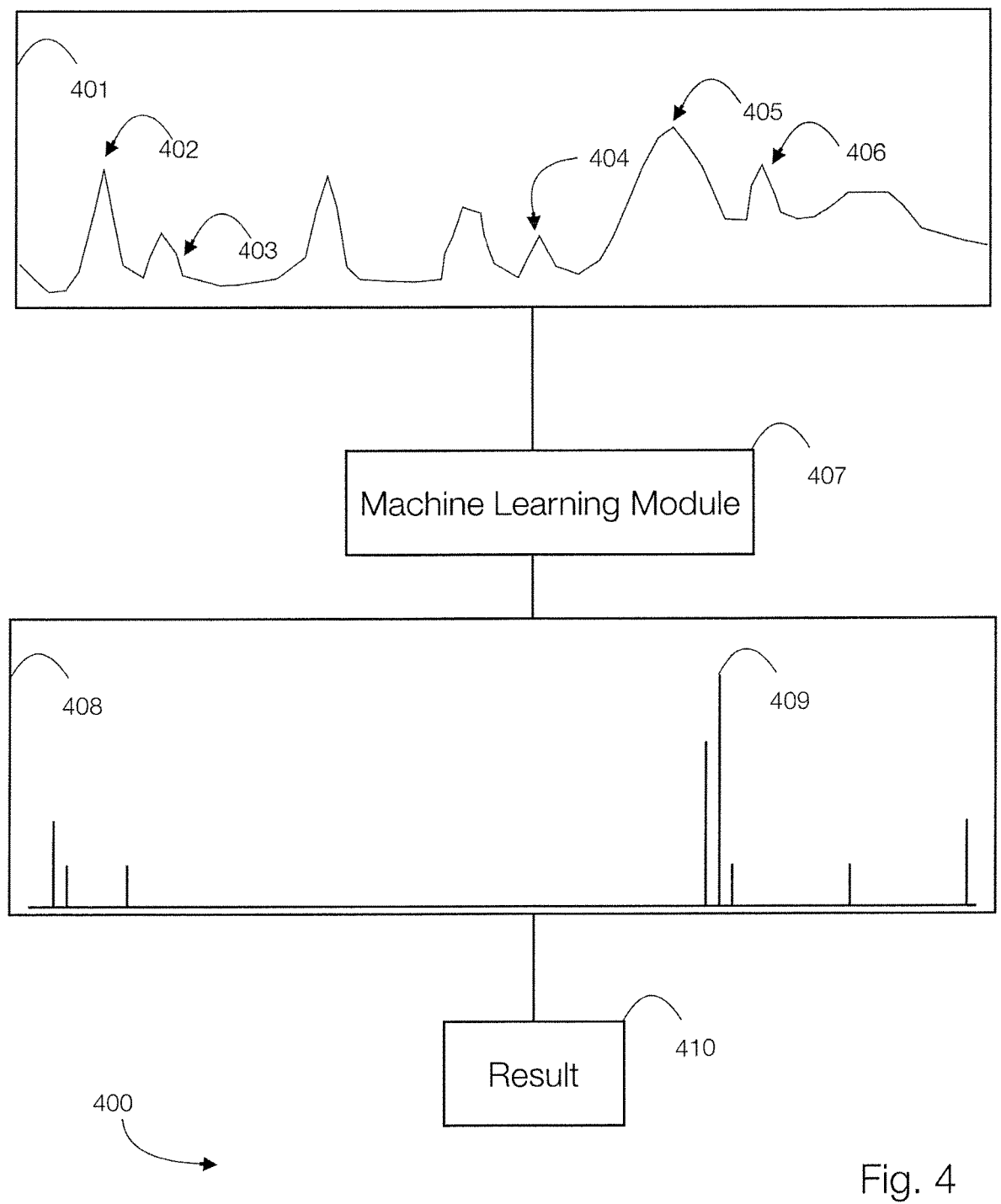
FIG. 4 shows a view of some embodiments of the inputs and outputs from a machine learning module.

In some configurations, the detector input can be converted to an output using the embodiments illustrated in FIG. 4. In these embodiments, a system 400 has detector input 401 featuring a variety of radiation-analyze interactions, including fluorescence peaks 402, background radiation scatter 403, coherent (Bragg) scattering 404, inelastic (Compton) scattering 405, and elastic (Rayleigh) scattering 406, among other types of interactions. These detector inputs are presented to the machine learning module 407 which determines which portions of detector input are relevant 409 to evaluate the detector input 401 by identifying key importance features within a region of the detector inputs 409. This process creates a resulting output 410 showing the energy spectra of the various elements that are present in the sample being analyzed. For example, the lower diagram in FIG. 4 shows that 8 different important features could be present in the sample diagnostic to a given qualitative or quantitative value. Each of the 8 importance features such as 409 corresponds to a different region of detector output. Each importance feature can also provide information about the concentration of the qualitative or quantitative value in the sample.

Figure 5:
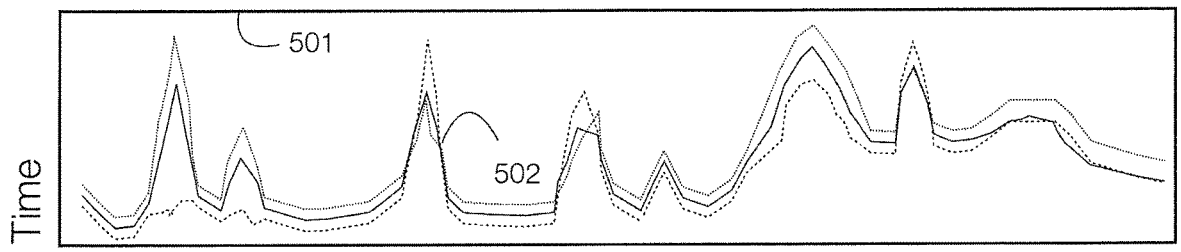
FIG. 5 depicts some embodiments of the pre-processing of the signal from the detector before inputting the signal into the machine learning module.
Figure 5:
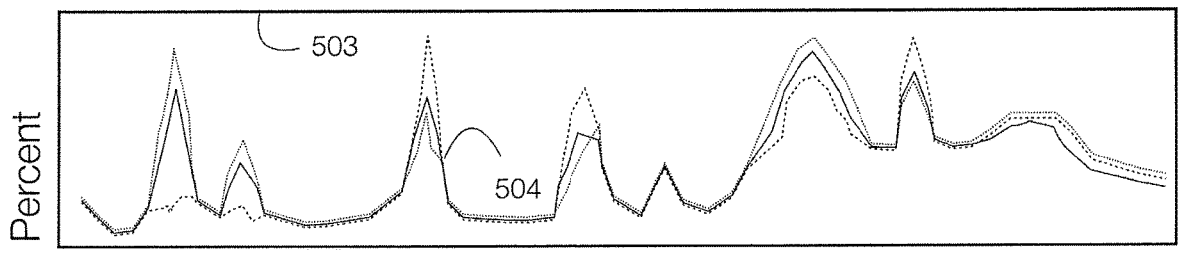
Figure 5:
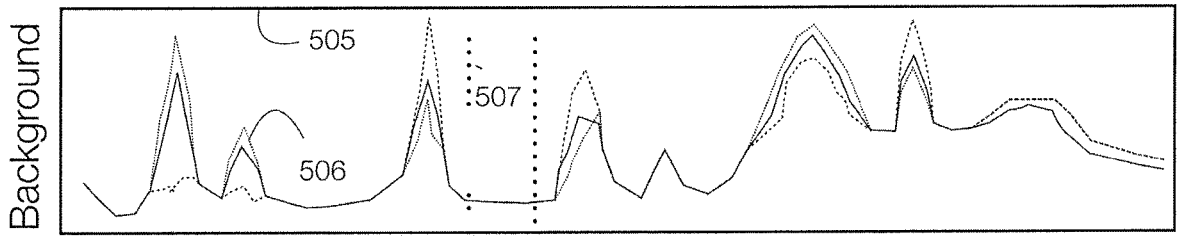
Figure 5:
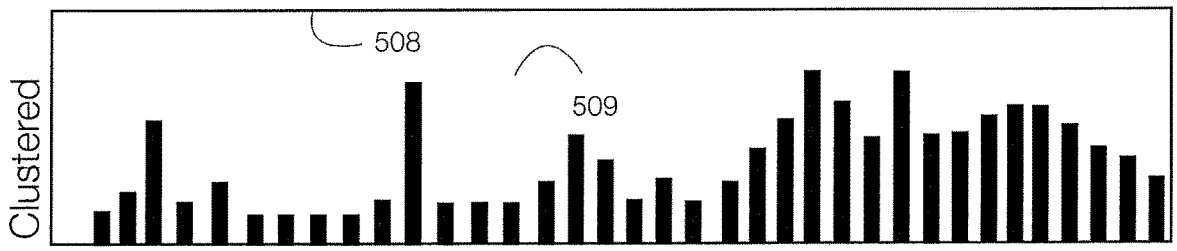

Other embodiments of the systems and methods described herein are illustrated in FIG. 5. In these embodiments, a machine learning module 500 can include three potential types of preprocessing that are helpful to map detector inputs to the models used by the machine learning module 500. In a time-based normalization method 501, the detector inputs 502 are presented to the machine learning model using counts per second or another unit of energy intensity by time. In a percent-based normalization method 503, detector input energy data 504 is normalized by its associated intensity as a percent of all energy intensities received by the detector. In a background-based normalization method 505, the detector input energy data 506 is normalized to an energy region of the detector input 507. In an optional preprocessing method, detector input energy counts 508 are binned for compression 509 using methods which can either increase the representation of features as illustrated in normalization steps such as 501, 503, and 505, or simply binned for more efficient processing during the training step. Each of these preprocessing steps could also include log transforms or other transformations which emphasize the expression of features. In each of these data preprocessing methods, detector input energy data are adjusted to change which aspects are emphasized for the machine learning models as part of the machine learning module 500.

Figure 6:
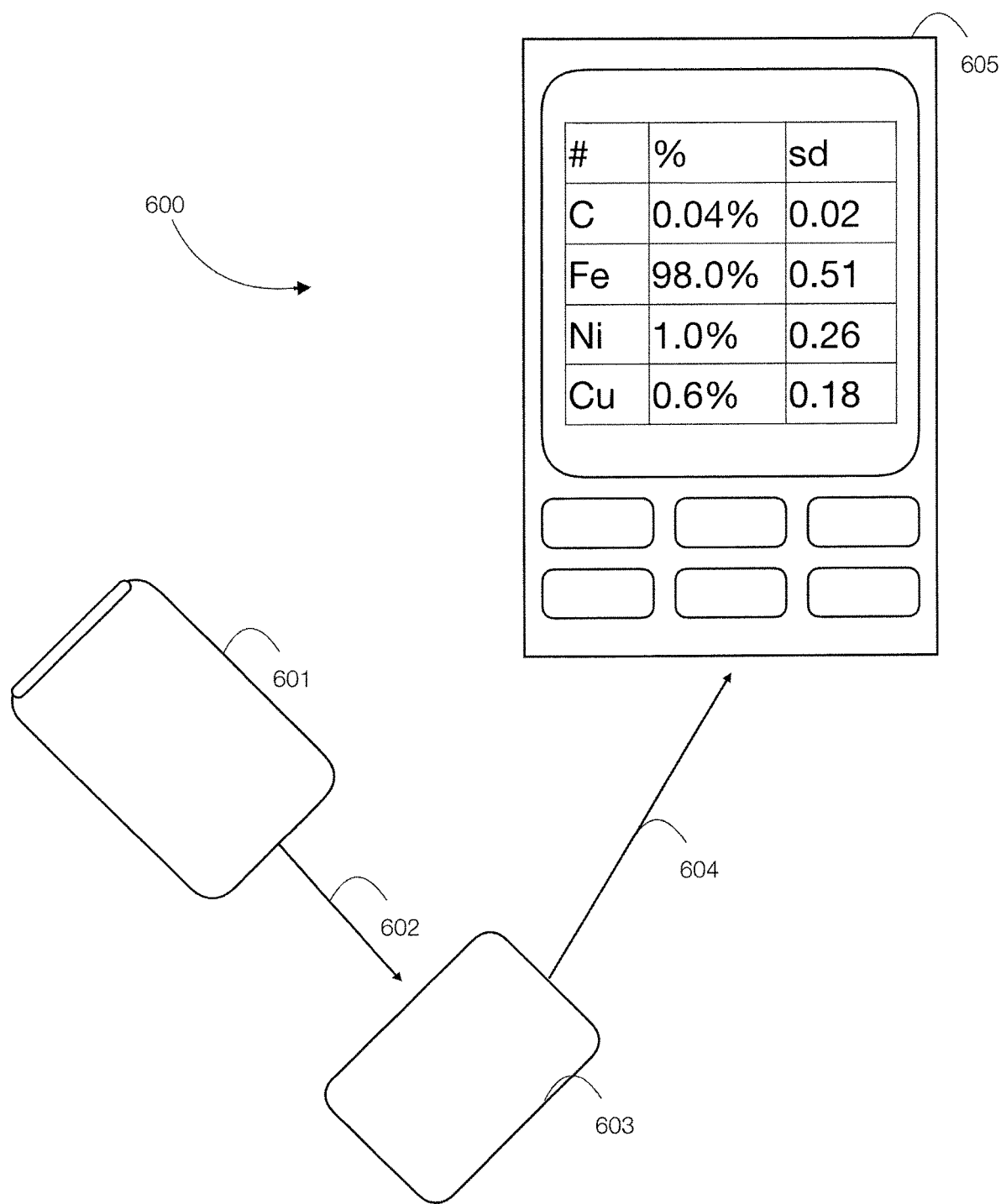
FIGS. 6-7 show views of some embodiments of the results displayed by the XRF systems.

Other embodiments of the systems and methods described herein are illustrated in FIG. 6. In these embodiments, system 600 contains detector input 601 that is relayed by a connection 602 to the machine learning module 603 which, in turn, is connected via connection 604 to a display 605 which presents quantitative outputs. As shown in FIG. 6, the display 605 shows the element present in the left column, the concentration of the element in the center column, and the standard deviation in the right column.

Figure 7:
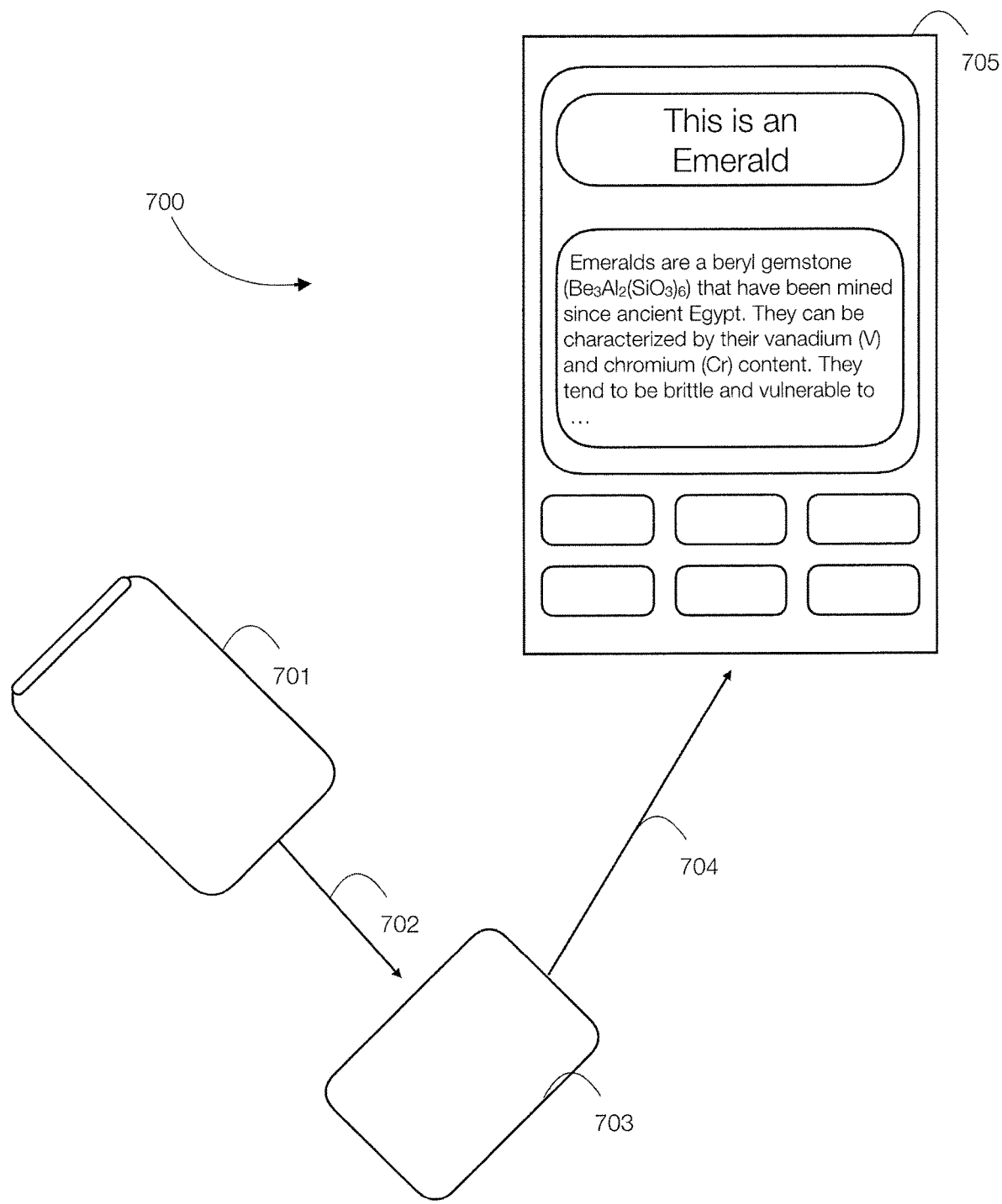

Other embodiments of the systems and methods described herein are illustrated in FIG. 7. In these embodiments, system 700 contains a detector output 701 that is relayed by a connection 702 to the machine learning module 703 which is connected via connection 704 to a display 705 which presents qualitative outputs which may or may not include contextually relevant background information.

The systems and methods described herein can determine the chemistry of a sample by measuring the fluorescent (or other high energy) x-ray emitted from it when excited or affected by primary x-rays. Each of the elements present in the sample produce a set of characteristic fluorescent x-rays (a fingerprint) that is unique for that specific element. But the system must be calibrated in order to ensure the results are accurate because each instrument, when manufactured, produces a different photon flux in addition to small differences in geometry that affect the final output. The intent of the calibration is to a) force coherence onto a population of machines to produce similar and reliable results and b) to convert the spectral data into actionable information that can be relied on by the operator of the instrument.

There have been numerous methods used for XRF instrument calibration. Some of these methods include comparing the XRF results against a known standard. Other methods have compared the XRF results with the results from other forms of analytical chemistry. But these methods were deficient since they are highly sensitive to matrix types, and are limited to values which are directly manifested in the spectrum, such as the K-alpha peak of Iron (Fe), the L-beta peak of Lead (Pb). In these methods, the measurement of peak intensity or amplitude are related directly to concentration of the value within the analyte. But these methods are subject to important limitations, including a) detection limit, b) a quantification protocol capable of accurately representing the composition of the analyte, and c) limitation to variables with diagnostic fluorescence or reflectance. Because of these limitations, these calibration techniques are specific to a given instrument. Any other instrument could not use the same calibration technique, but would rather require a separate calibration technique to be performed to produce useful information. In other words, these calibration techniques are instrument specific and can't be used across multiple instruments even if those instruments are similar or are even if they are of the same model type.

Indeed, instrument-specific calibration approaches encounter additional limitations besides those mentioned in the previous paragraph. The first limitation is that for empirical analysis, standards must be manually analyzed for every intended material type for each instrument. Second, the definitions for each variable must be predetermined (e.g., defined externally from the data). And third, any algorithmic corrections risk introducing covariance, in which relationships between the predictor variables bias the result in a manner difficult to detect. The systems and methods described herein improve on all three of these limitations. First, the machine learning model can be applied to more than one instrument, making it a scalable approach. Second, definitions for variables can be determined from all detector inputs, leading to optimal results. And third, randomized cross validation may be used to eliminate or significantly reduce the influence of covariance.

An additional limitation of calibration is that the detector input to be analyzed can be varied and complex. Examples of the detector inputs which could be used include ionizing radiation with fluorescence peaks of inner electron orbitals, outer electron orbitals, electron orbital changes, coherent scattering, Bremsstrahlung scattering, Compton (inelastic) scattering, Rayleigh (elastic scattering), sum peaks, or even escape peaks from the detector. Some of these detector inputs 103 are shown in FIG. 1B. Input infrared, visible, or ultraviolet light can interact with the outer surface of material to produce emission peaks characteristic of particular elements, molecules, or other definable properties of matter. The nature of a photon source of the input, be it fluorescent, isotopic, laser, reflectance, or flame can be used. Charged particles can also be used for excitation, such as electrons and protons. The source of excitation is secondary to its product, the ionization of electrons in an analyte that produces photons from which the properties of the analyte can be inferred. The nature of the geometry of the detector, analyte, and photon source can be either static or dynamic when producing detector inputs. Within the same instrument on the same detector, multiple detector inputs could be produced with different energy ranges, filtration, or reflectance materials for input into the machine-learning module. But the machine learning module described herein can be neutral with regard to the nature of how an input spectrum is produced or transformed, unlike some conventional machine learning calibration techniques which encountered difficulty with these variations and complexities. Instead, the distinction of the machine-learning module described herein arises from flexibility in integrating detector inputs and interpreting their variation into output qualitative/quantitative data via an automated supervised or unsupervised process.

One of the primary challenges of working with energy spectra as a detector input is their complexity. Specific geometries and energies of one part of the energy spectra are representative of a given electron energy/alignment, but they are convoluted with other parts of the energy spectra. In XRF, the energy peaks for an element like Dysprosium (Dy) can be obscured by the energy peaks for Iron (Fe). Iron (Fe) has 2 K emissions in XRF which overlap with Dysprosium (Dy) L emissions, but up to 18,000 in atomic emission spectroscopy (AES) which overlap with many other elemental lines, such as 402 in FIG. 4.

The advent of machine learning methods helps meet this primary challenge since they have the ability to completely analyze the spectrum produced by detectors. Machine learning techniques such as forest regressions, forest classification, gradient boosting, and neural networks, among others, present methods to impartially analyze the whole spectrum produced by detectors and integrate it with other existing information. However, machine learning algorithms cannot improve upon the original data presented to them. Preprocessing of data has the potential to emphasize key features that machine learning can use to draw generalizable rules for interpreting data. The systems and methods described herein in connection to FIG. 5 illustrate how detector input preprocessing can emphasize important features to train machine learning models on identifying quantitative or qualitative values. These models can then predict qualitative and quantitative values from instruments with similar configurations as illustrated in the system 50 of FIG. 1A and system 100 of FIG. 1B.

These machine learning techniques are also deficient in other ways besides the power requirements. First, these machine learning techniques can be much more vulnerable to outliers, even though machine learning cross validation iterations can reduce this risk. Second, these machine learning techniques can also be constrained by co-variance, where predictors in a model themselves are correlated and lead to inflated model metrics and overfitting. Third, these machine learning techniques can be constrained by a-priori definitions of how a given independent variable relates to the input data from a detector; whereas the machine learning module described herein can derive its own definitions from the data itself. This leads to much higher accuracy and flexibility in machine learning approaches. The machine learning module described herein also uses data preprocessing which can prepare the data for the analysis, increasing the efficiency of the machine learning process and decreasing the time and computer power needed. Examples of the data preprocessing includes normalizing by time of acquisition, proportional representation of a given detector input relative to all other detector inputs, or normalization to a region of interest in the spectrum based on the properties of the target measurement, as illustrated in FIG. 5. Additional preprocessing steps such as log transforms can also emphasize key features.

The machine learning module described herein presents a different relationship with traditional implementations for a given variable. An example of a traditional use of quantification algorithms in in x-ray spectrometry is as follows:

$$C_i = r_0 + I_i(r_i + \Sigma r_n * I_n)$$

where $C_i$ represents the concentration of element, $r_0$ is the intercept/empirical constant for element i, $r_i$ is the slope/empirical coefficient for intensity of element i, $r_n$ is the slope/empirical constant for effect of element n on element i, $I_i$ is the net intensity of element I, and $I_n$ is the net intensity of element n. This is known as the Lucas-Tooth and Price equation and an assumption underlying this equation is that the independent variables are pre-determined ($I_{i...n}$) in their definition with a specified energy range. For example, Iron (Fe) K-alpha fluoresces at 6.4 keV, its peak definition ($I_{FeK\alpha1}$) could be 6.4±0.2 keV, or based on a 68% area underneath a Gaussian distribution at 6.4 keV.

The machine learning modules differs from this equation and does not use a pre-determined definition for a variable [I] like Fe. Instead, the machine learning module uses in some configurations an equation for a given iteration that resembles:

$$C_i = re_i \times re_{i+1} \times \ldots re_{i+n}$$

where $e_i$ represents a given energy which could be calculated from detector output and r represents a given weight or series of weights and/or other modifications for a particular energy (e). This equation can be iterated using randomly-selected known values to generate a definition for a given element, such as Fe. However, random selection does not require that variables are not positional, e.g., that their adjacent points in the spectrum are not part of the information transmitted to the model. The definition of Fe can then be formed relative to the nature of a specified data set with an iterative approach, rather than selected a-priori. And the interaction of high energy photons with the analyte to produce ($e_i$) is not restricted to just fluorescence. The photon-analyte interactions that can be analyzed by the machine learning modules described herein can include Compton (inelastic) scattering, Rayleigh (elastic) scattering, Bragg (coherent) scattering, random scattering indirectly related to Bremsstrahlung radiation from the source, and other interactions not directly produced due to fluorescence. Indeed, some embodiments can use a regression framework to evaluate variable ($e_i$) importance. Other embodiments, however, could use variants that include decision trees, support vector machines (SVMs), k-nearest neighbor classifiers, and other ensemble machine learning techniques related to detector output and existing information about a given material. The object of these embodiments is similar to some conventional quantification and/or classification methods that create generalizable models that can be employed on materials of a given matrix.

In the systems and methods described herein, the matrix of an analyte material can be a gas, liquid, or solid material. As well, the interaction of photons can be variable within and between atoms, diagnostic to either molecules or elements respectively depending on the detector employed. The integration of multiple detector inputs in the systems and methods described herein allows for automated serialized or parallel determination of qualitative or quantitative values for the detector output, depending on the particular procedure employed. In some configurations, though, the systems and methods described herein do not require either serialization or parallel analysis.

In some configurations, the machine learning module described herein can use training of algorithms on a particular data set. This training requires detector input from samples with known or estimated composition or qualities related to the final output values obtained using the machine learning module. As an example, a family of standards determined via a method such as inductively-coupled plasma spectroscopy or determined via an institution such as the National Institute of Standards and Technology could be analyzed given a known instrumental method(s). The detector inputs could then be systematically analyzed datum by datum of raw, transformed, or otherwise preprocessed analytic output from given sensor/sensors. This training can use multiple decision trees informed by randomized cross-validation against given raw analytic output against the known values, a single tree and/or linear model that is updated through gradient boosting or another iterative technique, and/or third a series of weights to adjust the combination of variables. This procedure used in the training could be replicated tens, hundreds, thousands, or even millions of times. The raw analytic detector input can be weighted so that the portions of the detector input with the highest predictive power of the known value can be prioritized in future estimations from unknown detector inputs in the machine learning modules described herein.

Figure 2:
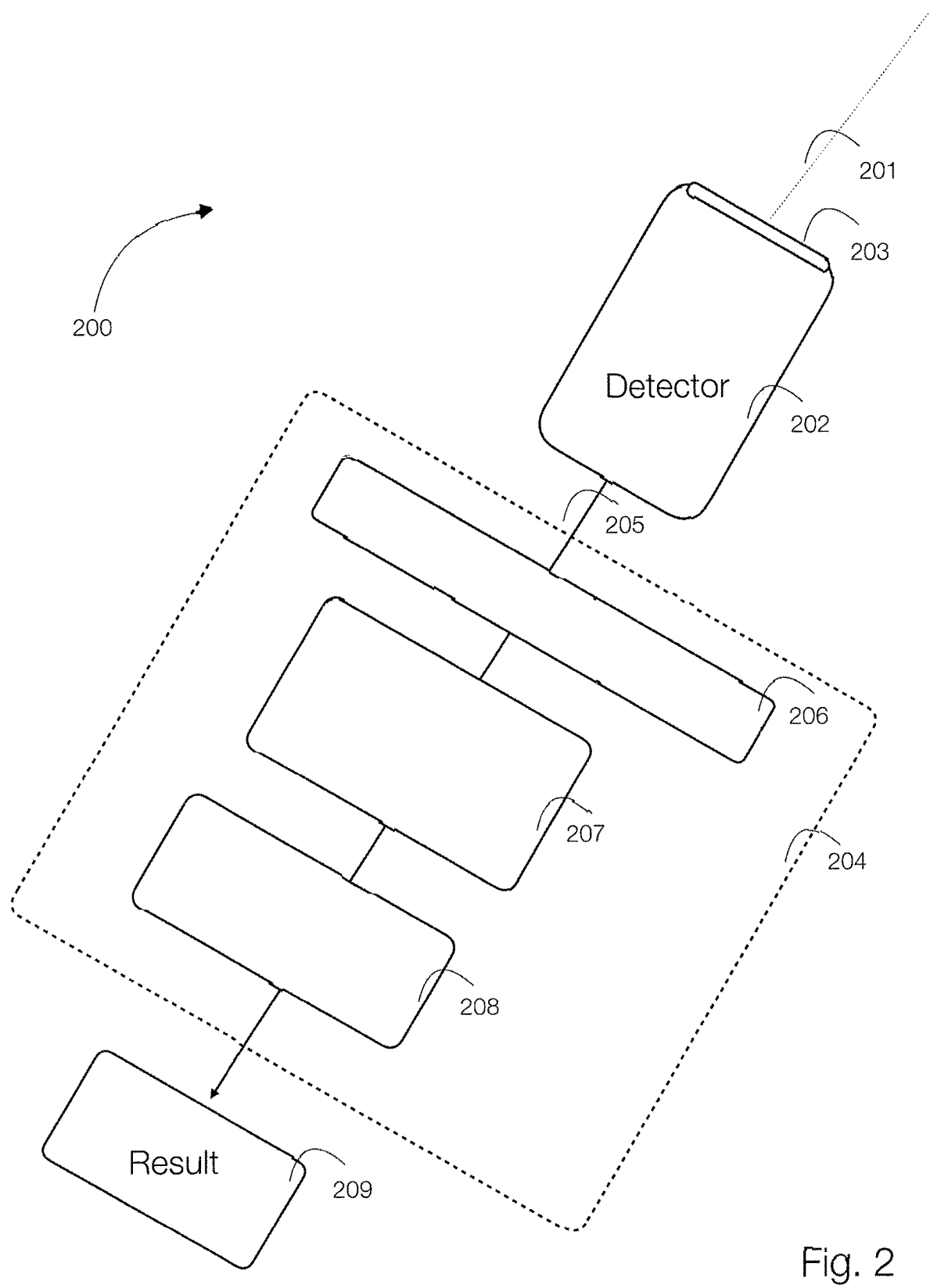
FIG. 2 shows a view of some embodiments of part of an XRF system containing a machine leaning module.

Some methods to obtain the quantitative output 90 from the machine leaning module as shown in FIG. 2 use continuous variable data such that analytes which do not necessarily match a particular known value can nonetheless be estimated based on properties in its detector inputs. These methods can include random forest regressions, gradient boosting, k-nearest neighbors, splines, support vector machines, and neural networks, among others. Given that these methods can be iterative, the evaluation of the iterations can include the sum of least squares (r2), root mean square error, mean absolute error, classification accuracy, the Akimi Information Criterion (AIC), the Bayesian information criterion (BIC), a specified validation coefficient, or other determining metrics which can be used to discriminate between useful variables and models. Evaluation can be done on either an entire or subset of the inputs in any given iteration. For the qualitative output 90 in FIG. 2, for example, one approach would be classification via association with a pattern of values or quantitative determination with existing sensory data via similar methods described for quantitative output.

The results from the machine learning module can include a diagram of detector input influence 403, as illustrated in FIG. 4, which can be used to precisely target the detector input subsets which informs quantification and/or classification of the instruments jointly. The influence spectra, which documents the aggregate of all the input detector counts related to the detector input from the standards used, identifies the regions of the detector input which have predictive power over quantitative or qualitative outputs. Importantly, this influence diagram can be from one or more detector inputs, meaning a given quantification model for a quantitative or qualitative outputs can come simultaneously from different regions of the input detector via different optimizations. For example, the prediction of an output qualitative ordinal scale from "good" to "bad" could be informed by any product of ionizing radiation as relayed by the influence diagram from the detector input. Another example is quantifying an indirect quantity output constrained by the detector input, such as hydrogen which does not have a k-alpha emission, by using proxies in an x-ray spectrum characterized by both fluorescence and coherent scattering. The machine learning module is capable of weighting the influence of detector inputs from each sample in terms of its influence on the predictive model for quantitative and/or qualitative outputs.

The machine learning module identifies both direct and indirect signals of a given value in the XRF instrument(s). As such, a quantification model for particular element [i.e., Sodium (Na)] output from detector input could include a direct proxy for that element, such as the Na K-alpha emission alongside indirect measurements of other class I elements such as the K-alpha and K-beta emissions of Potassium (K) and Rubidium (Rb) as well as a change in the Compton (inelastic) scattering of x-rays of the analyte, even though it is also possible that an element like Na can be successfully infected without regard to its K-line fluorescence. The particular method used for this quantification model will be determined by the machine-learning module, in either a supervised or unsupervised mode, where supervised machine learning includes instances where external information is provided (known or estimated values) to guide analysis (e.g., standards) while unsupervised machine learning includes pattern recognition in the data.

The machine learning module can be deployed either locally on a computer connected directly with the XRF equipment, such as a computer 300 shown in FIG. 3, and/or remotely using a server. The complexity of the data used by the machine learning module may require processing power and time beyond most computers that are used with XRF systems, thus the possible use for a server-based implementation and/or parallelization or serialization.

The machine learning module can also be connected to any type of electronic device with a wired or a wireless connection. In these embodiments, the machine learning module can transmit data to the desired electronic device, such as a computer 300 shown in FIG. 3, which can be used to further analyze the data and/or image from the detector. In other embodiments, however, the machine learning module can be connected with any wireless communications device, such as a cell phone or other portable electronic device, that can be paired with the desired electronic device. In other embodiments, though, the machine learning module can be part of the desired electronic device and so the machine learning module passes the quantitative/qualitative output directly to the display portion of the electronic device for the user to view.

Thus, the systems and methods described herein interpret high energy photon interactions in a sample via a detector and use that information as an input for a machine-learning module which can produce as its output a variety of qualitative and quantitative models. The high energy photon light interacts with the sample, producing a number of interactions including Rayleigh (elastic) scattering, Compton (inelastic) scattering, Bragg (coherent) scattering, fluorescence, and other photon-fermion interactions. These interactions are detected by the detector which produces a series of counts that are interpreted by the machine learning module. This module can, with existing data about the materials in the sample, produce qualitative classes or quantitative units as an output. The existing data can comprise compositional data about the analyte, membership of the analyte in a class, or any other qualitative or quantitative attribute. The counts are determined by a counting mechanism within the detector that provides data about each element in the sample in a continuous interval, which can be used either in a full or summarized form by the module. The high energy photon interactions are determined by the machine learning module to identify relationships in the detector output that include random forests, gradient boosting, linear support vector machines, neural networks, and k-nearest neighbors, among others. The fluorescent peaks shown in the output form the module are not pre-determined, but rather guided by relationships within the input from the detector. The manifestation of the target variable output through fluorescence is not required.

The geometric relationship between the radiation source, analyte, and detector in the XRF systems does not depend on any one particular configuration and can be varied from instrument to instrument. A key difficulty in analyzing with any XRF instrument, but particularly for those which engage in non-destructive analysis, is the calibration of multiple units where the configuration between these three components varies from instrument to instrument. A manufacturer may produce thousands of XRF instruments, each of which requires manual calibration to a number of standards. Each instrument then needs a set investment in time and labor to provide it effective analytical capabilities.

The machine learning module described herein improves on this instrument-by-instrument calibration process. The machine learning module described herein can be used with multiple instruments of a given class to provide a functional model capable of being applied by any instrument of that class. And the machine learning module addresses this inter-instrument reproducibility in a scalable manner. If a small subset of instruments, which represent the range of variation for that instrument class, are calibrated using the machine learning module described herein, it can allow for the transfer of those resulting calibrations to other instruments by differentiating between diagnostic and instrument-dependent signals in the data input from the detector. This ability allows for a given set of analysis to scale without manual calibration on each, while maintaining integrity of the analysis and its ability to be reproduced by other devices or equipment.

An example of why the calibration using the machine learning module described herein is advantageous can be illustrated in the following hypothetical example. The L-alpha and -beta lines for lead (Pb) fluoresce at 10.5 and 12.5 keV, respectively. In a silicate material, these x-ray energies will penetrate through 900 and 1600 μm, respectively through a silicon dioxide ($SiO_2$) matrix. However, a lead-oxide material would have much smaller penetration depths of 44 and 70 μm, respectively. A set of known standards used to quantify Pb ranging from pure $SiO_2$ to PbO would be unable to rely on the fluorescence lines, as with higher concentrations of Pb the Pb lines themselves would be reabsorbed. As such, a naive regression model which assumes increasing Pb fluorescence corresponds to increasing Pb concentration would be unable to function. The machine learning module described herein would allow Pb to be estimated by, in one hypothetical implementation, automatically identifying regions of the spectrum which correspond to density shifts, including but not limited to Compton peaks, Rayleigh peaks, or secondary effects of Bremsstrahlung radiation to infer density and, by proxy, the concentration of Pb. Alternatively, a classification system would match the entire spectrum to its newest match qualitatively. In either implementation, the algorithm would evaluate the entire spectrum and various forms of scattering in addition to x-ray fluorescence.

Described herein:

A1. An analysis method, comprising:
impinging radiation from a source on an analyte;
detecting energy interactions resulting from the impinging radiation using a radiation detector;
adjusting the signal from the radiation detector using a machine learning module to emphasize specific parts of the detector signal;
training the machine learning module in a supervised or unsupervised manner;
producing quantitative and qualitative models using the machine leaning module; and
applying the machine learning module to additional energy interactions.

A2. The method of claim A1, wherein the existing measurements comprise compositional data about the analyte though empirical measurements or estimated values, membership of the analyte in a class, or any other quantitative or quantitative attribute.

A3. The method of claim A1, wherein the detector signals are determined by a counting mechanism within the detector that provides data in a continuous interval, which can be used either in a full or summarized form by the module.

A4. The method of claim A1, wherein normalization or another data pre-processing step may take place to adjust detector counts as a normalization process or method to highlight distinctive features for input mapping into the machine learning module.

A5. The method of claim A1, wherein machine-learning algorithms are used to identify relationships in detector output with or without normalization including, but not limited to, random forests, gradient boosting, support vector machines, neural networks, and k-nearest neighbors, among others.

A6. The method of claim A1, wherein the use of fluorescent peaks is not necessarily pre-determined, but can also be guided by relationships within the input from the detector.

A7. The method of claim A1, wherein the geometric relationship between the radiation source, analyte, and detector is not dependent on any one particular configuration, but could be optimized for any variable output.

A8. The method of claim 1A, wherein information from other instruments can be used as a part of supervised training.

A9. The method of claim A1, wherein the photons comprise those with potential ionizing effects on a sample.

A10. The method of claim A9, wherein the detector input into the machine learning module may include photon-fermion interactions that are not the product of ionization.

A11. The method of claim A1, wherein the geometric relationship or component composition could vary within a set of limits, and machine learning acts within the range of these differences.

A12. The method of claim A1, further comprising applying the quantitative and qualitative models during analysis of the radiation.

A13. The method of claim A1, wherein charged particles from a source could include photons, electrons, or protons with the ability to ionize an analyte.

B1. An analysis method, comprising:
using a radiation detector to detect energy interactions resulting from radiation impinging on an analyte;
adjusting a signal from the radiation detector using a machine learning module to emphasize specific parts of the detector signal;
training the machine learning module in a supervised or unsupervised manner;
producing quantitative and qualitative models using the machine leaning module; and
applying the machine learning module to additional energy interactions.

B2. An analysis method, comprising:
receiving a signal from a radiation detector that has detected energy interactions from radiation impinging on an analyte;
adjusting the signal using a machine learning module to emphasize specific parts of the detector signal;
training the machine learning module in a supervised or unsupervised manner; and
producing quantitative and qualitative models using the machine leaning module.

B3. The method of claim B2, further comprising applying the machine learning module to additional energy interactions.

C1. An analysis system, comprising:
a radiation source;
a radiation detector; and
a machine learning module configured to:
receive a signal from the radiation detector that has detected energy interactions from radiation impinging on an analyte;
adjust the signal to emphasize specific parts of the detector signal;
train itself in a supervised or unsupervised manner; and
produce quantitative and qualitative models.

C2. The system of claim C1, wherein the machine leaning module is further configured to apply the quantitative and qualitative models to additional energy interactions.

D1. An analysis method, comprising:
impinging radiation from a source on an analyte;
detecting energy interactions resulting from the impinging radiation using a radiation detector;
adjusting the signal from the radiation detector using a machine learning module to emphasize specific parts of the detector signal;
training the machine learning module in a supervised or unsupervised manner; and
producing quantitative and qualitative models using the machine leaning module.

E1. An analysis method, comprising:
impinging electrons from a source on an analyte;
detecting energy interactions resulting from the impinging electrons using a radiation detector;
adjusting the signal from the radiation detector using a machine learning module to emphasize specific parts of the detector signal;
training the machine learning module in a supervised or unsupervised manner; and
producing quantitative and qualitative models using the machine leaning module.

F1. An analysis method, comprising:
impinging protons from a source on an analyte;
detecting energy interactions resulting from the impinging protons using a radiation detector;

adjusting the signal from the radiation detector using a machine learning module to emphasize specific parts of the detector signal;

training the machine learning module in a supervised or unsupervised manner; and producing quantitative and qualitative models using the machine leaning module.

G1. An analysis method, comprising:

impinging radiation from a source on an analyte;

detecting energy interactions resulting from the impinging radiation using a radiation detector;

adjusting the signal from the radiation detector using a machine learning module to emphasize specific parts of the detector signal; and applying a machine learning module to the adjusted signal to predict qualitative and quantitative properties.

H1. An analysis method, comprising:

impinging electrons from a source on an analyte;

detecting energy interactions resulting from the impinging electrons using a radiation detector;

adjusting the signal from the radiation detector using a machine learning module to emphasize specific parts of the detector signal; and applying a machine learning module to the adjusted signal to predict qualitative and quantitative properties.

J1. An analysis method, comprising:

impinging protons from a source on an analyte;

detecting energy interactions resulting from the impinging protons using a radiation detector;

adjusting the signal from the radiation detector using a machine learning module to emphasize specific parts of the detector signal; and applying a machine learning module to the adjusted signal to predict qualitative and quantitative properties.

In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, the examples and embodiments, in all respects, are meant to be illustrative only and should not be construed to be limiting in any manner.

The invention claimed is:

1. An analysis method, comprising:

impinging radiation from a source on an analyte;

detecting energy interactions resulting from the impinging radiation using a radiation detector, wherein the radiation detector produces a signal indicative of the detected energy interactions;

adjusting the signal from the radiation detector using a machine learning module to emphasize specific parts of the signal;

training the machine learning module in a supervised or unsupervised manner;

producing quantitative and qualitative models using the machine leaning module; and applying the machine learning module to additional energy interactions.

2. The method of claim 1, wherein the machine learning module uses existing measurements, wherein the existing measurements comprise compositional data about the analyte though empirical measurements or estimated values, membership of the analyte in a class, or a known energy peak for a material of the analyte.

3. The method of claim 1, wherein the signal is determined by a counting mechanism within the radiation detector that provides data in a continuous interval, which can be used either in a full or summarized form by the machine learning module.

4. The method of claim 1, further comprising a normalization or data pre-processing step that adjusts detector counts to highlight distinctive features for input mapping into the machine learning module.

5. The method of claim 1, wherein the machine-learning module uses one or more algorithms to identify relationships in the signal of the detector, wherein the relationships in the signal of the detector comprise random forests, gradient boosting, support vector machines, neural networks, or k-nearest neighbors.

6. The method of claim 1, wherein the machine learning module provides an output having fluorescent peaks that are guided by relationships within the signal from the radiation detector.

7. The method of claim 1, wherein detecting energy interactions resulting from the impinging radiation using a radiation detector;

wherein the machine learning module is trained in a supervised manner, wherein the radiation detector is a first radiation detector, and wherein information from at least a second radiation detector used as a part of supervised training of the machine learning module.

8. The method of claim 1, wherein the radiation comprises photons, and wherein the photons have ionizing effects on the analyte.

9. The method of claim 8, wherein the signal of the detector that is input into the machine learning module is indicative of photon-fermion interactions that are not the product of ionization.

10. The method of claim 1, wherein the additional energy interactions result from impinging radiation on an analyte, and wherein the method further comprises applying the quantitative and qualitative models during analysis of the additional energy interactions.

11. The method of claim 10, wherein the radiation detector that produces the signal is a first radiation detector, and wherein the additional energy interactions are detected by a second radiation detector that produces a second signal indicative of the additional energy interactions.

12. The method of claim 1, wherein the radiation comprises charged particles, and wherein the charged particles include photons, electrons, or protons with the ability to ionize the analyte.

13. The method of claim 1, wherein the source is an X-ray source, and wherein the radiation detector is an X-ray detector.

14. The method of claim 13, wherein signal of the X-ray detector is indicative of the fluorescent X-ray emitted from the analyte, and wherein the machine learning module determines a chemistry of the analyte.

15. The method of claim 1, wherein the signal is indicative of fluorescence peaks, background radiation scatter, coherent (Bragg) scattering, inelastic (Compton) scattering, or elastic (Rayleigh) scattering.

16. The method of claim 15, wherein the machine learning module provides an output showing energy spectra of elements that are present in the analyte.

17. The method of claim 16, wherein the machine learning module provides the output to a remote computing device.

18. An analysis method, comprising:
- using a radiation detector to detect energy interactions resulting from radiation impinging on an analyte, wherein the radiation detector produces a signal indicative of the detected energy interactions;
- adjusting the signal from the radiation detector using a machine learning module to emphasize specific parts of the signal;
- training the machine learning module in a supervised or unsupervised manner;
- producing quantitative and qualitative models using the machine leaning module; and
- applying the machine learning module to additional energy interactions.

19. An analysis system, comprising:
- a radiation source;
- a radiation detector; and
- a machine learning module configured to:
  - receive a signal from the radiation detector, the signal being indicative of detected energy interactions from radiation impinging on an analyte;
  - adjust the signal to emphasize specific parts of the signal;
  - train itself in a supervised or unsupervised manner; and
  - produce quantitative and qualitative models.

20. The analysis system of claim 19, wherein the machine leaning module is further configured to apply the quantitative and qualitative models to additional energy interactions.

21. The analysis system of claim 20, wherein the radiation source is an X-ray source, and wherein the radiation detector is an X-ray detector.

* * * * *